United States Patent [19] [11] Patent Number: 5,961,609
Kayes et al. [45] Date of Patent: *Oct. 5, 1999

[54] EXTENSIBLE TEST METHOD AND APPARATUS USEFUL FOR RENDERED CONTROLS

[75] Inventors: Kevin W. Kayes; Daniel H. Schaffer, both of Colorado Springs, Colo.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/623,542

[22] Filed: Mar. 29, 1996

[51] Int. Cl.$^6$ .................................................. G06F 11/00
[52] U.S. Cl. ............................................ 709/300; 702/119
[58] Field of Search ............................. 395/183.14, 680; 709/300, 303; 702/119, 123

[56] References Cited

U.S. PATENT DOCUMENTS 5,335,342  8/1994  Pope et al. .......................... 395/183.14
5,421,006  5/1995  Jablon et al. ...................... 395/183.12

OTHER PUBLICATIONS

Morgan et al. "Webmaster Expert Solutions", QUE, pp. 247–254, 1996.
Orfali, et al. "Essential Client/Server Survival Guide", Van Nostrand Reinhold, p. 13, 1994.
Lawless, Jim, "Client/Server Development and the World Wide Web", Dr. Dobb's Sourcebook, Nov./Dec. 1995 p. (13), Nov. 1995.

*Primary Examiner*—Alvin E. Oberley
*Assistant Examiner*—St. John Courtenay, III
*Attorney, Agent, or Firm*—William J. Kubida; Stuart T. Langley; Holland & Hart LLP

[57] ABSTRACT

Information is extracted in text form from a graphically oriented application program by commands originating in a test program module. The application module is configured compatibly with the test program module so that it responds with the requested information through the use of a hidden field or window embedded in the application module. The hidden field facilitates communication between the test program and application modules so that the exchanges are transparent to the application user.

15 Claims, 4 Drawing Sheets

EXTENSIBLE TEST METHOD AND APPARATUS USEFUL FOR RENDERED CONTROLS

BACKGROUND OF THE INVENTION

1. Field of the Invention

The present invention relates to computer implemented modules for automatic testing of application programs. More particularly, the present invention relates to computer implemented program modules suitable for acquisition of information upon demand originating from a testing program.

2. Description of the Related Art

An application program is referred to as "rendered" if it was formatted into a graphic window presentation. Testing graphically-oriented custom controls using standard contemporary test programs is traditionally accomplished only by capturing bitmaps. In many cases, the custom control contents is in the form of text and numerals, as well as graphical information. To properly test the control, a test tool must have access to the data specifically correlated to the function under test.

A bitmap of the data does not suffice. While a bitmap might contain the desired data within its confines, it is difficult and awkward, if not impossible, to extract particular information from the mass of the bitmap information.

The test programs are able to use standard Windows Application Program Interface (API) calls to manipulate (i.e., get and set) data in static text fields. A simple protocol is needed to allow the test tool to request and receive data from the application.

SUMMARY OF THE INVENTION

In accordance with this invention, the above problem is solved by providing an automatic data exchanging arrangement in a computing system through the computer-implemented steps of including program modules in both the test program and the application which cooperate to request and receive data from the application. The test program module specifies the desired data and hidden fields in the application program module respond by extracting that data for return to the test module in a manner transparent to the application program user.

Thus, the present invention is concerned with a method of automatic data exchanging between a test program which requires selected information concerning an application program. The application program is configured to store information in graphic presentation form in a computing system. This invention employs a series of computer-implemented steps, including a command-generating module in the test program to request information from the application program. A hidden storage field for text is established.

A command is transferred from the test program module to the application program where the information requested by that command is identified, retrieved and placed in the hidden storage field. The test program module is notified that the requested information is available. This can be done by setting a flag in at least one position in the hidden storage field when the requested information is available. The test program module periodically samples this flag position to determine if the information is present.

The information placed in the hidden field is formed as an array of characters, including the flag and the requested information. The present invention is suitable for inclusion in a test tool or program intended for determining the operational integrity of an application program.

The above computer-implemented steps in another implementation of the invention are provided as an article of manufacture; i.e., a computer storage medium containing a computer program of instructions for performing the above-described steps. Such a computer program storage medium is readable by a computing system, and retains encoding of a computer program of instructions for executing a computer process to interface a test program with an application program substantially as described above, as well as subsequently herein.

In a machine implementation of the invention, apparatus for data exchanges between a test tool and the application module are incorporated in a computer which includes an arrangement for requesting information from the application. This information is coupled back into the test program where it is useful in determining if the application is exhibiting correct behaviors or, in some instances, whether it is functioning properly.

The present invention is particularly advantageous and useful for obtaining information on the actual behavior of a computer, and/or computer program where information needed to aid in determining if the machine and/or program are functioning properly is normally present in a graphics oriented format.

The present invention advantageously utilizes hidden fields, or windows, inserted into an application program to respond to an inquiry from a test module. The inquiry is instituted by insertion of a command into the hidden field by the test program. The application module can either respond to this event immediately, or by periodically inspecting for its presence. For instance, the application program might check the field for a command presence each time an application graphical update operation is achieved.

The application module has a dedicated storage area monitoring system component operation. Standard static text fields are retained. If, for example, disk information is monitored, the text fields might store three informational segments, such as the identification of the disk drive (L), the number or percentage of hits for that drive (H) and the number or percentage of misses (M) for that drive. The hits and misses refers to statistical information about a cache storage. That is, the hits are the percentage of times a particular item is found present in a cache storage and the misses are the converse.

Apparatus in accordance with this invention is operable for the purpose of automatic data exchanging between an application program and a test program which requires selected information concerning that application program, and wherein the application program is normally configured to store information in graphic presentation form in a computing system. A module in the test program generates a command to request information from the application program. A hidden storage field is dedicated for exclusive use by this apparatus.

A parser operates in conjunction with the application program for identifying the information requested by a given command from the test program module. The requested information is retrieved and placed in the hidden storage field. A flag generator notifies the test program module that the requested information is available in the hidden field. Thus, the hidden storage field can include at least one position settable by the flag generator when the requested information is available.

A test program component thus can periodically sample the flag generator settable position. The hidden storage field can include storage positions for retaining an array of characters, including the flag generator settable position and the requested information. This test program component retrieves the requested information from the hidden storage field in response to presence of a flag in the aforesaid settable position.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

The embodiments of the invention described herein are suitable for implementation as logical operations in a distributed processing system having client and server computing systems. The logical operations of the present invention are implemented (1) as a sequence of computer implemented steps running on the computing system, and (2) as interconnected machine modules within the computing system. The implementation is a matter of choice dependent on the performance requirements of the computing system implementing the invention. Accordingly, the logical operations making up the embodiments of the invention described herein are referred to variously as operations, steps or modules.

Figure 1:
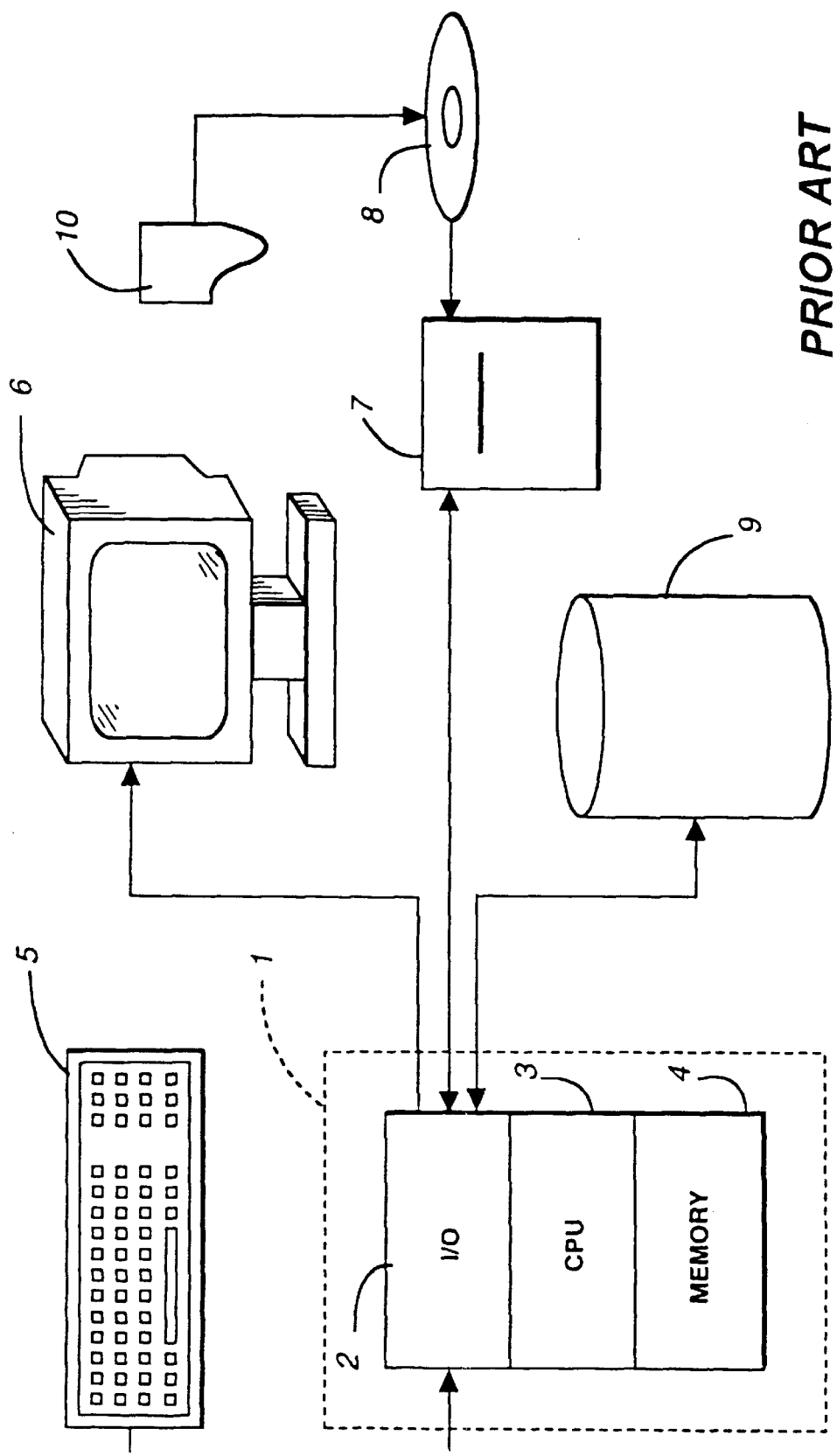
FIG. 1 illustrates a computing system to perform the computer implemented steps in accordance with the invention.

One operating environment in which the present invention is potentially useful encompasses the general distributed computing system. In such a system, general purpose computers, workstations, or personal computers are connected via communication links of various types, in a client server arrangement. Programs and data, many in the form of objects, are made available by various members of the system. Some of the elements of a general purpose workstation computer are shown in FIG. 1, wherein a processor 1 is shown having an input/output (I/O) section 2, a Central Processing Unit (CPU) 3 and a memory section 4.

The I/O section 2 is connected to keyboard 5, display unit 6, disk storage unit 9 and disk drive unit 7. Generally, in contemporary systems, the disk drive unit 7 is a CD-ROM drive unit capable of reading a CD-ROM medium 8 which typically contains programs 10 and data. The computer program products containing mechanisms to effectuate the apparatus and methods of the present invention may reside in the memory section 4, on a disk storage unit 9, or on the CD-ROM 8 of such a system. Examples of such systems include SPARC systems offered by Sun Microsystems, Inc., personal computers offered by IBM Corporation and by other manufacturers of IBM-compatible personal computers, and systems running the UNIX operating system.

The present invention is concerned with computer-implemented modules for automated testing of application programs. More particularly, the present invention relates to computer-implemented program modules suitable for acquisition of information by a testing program where the information relates to an application program. Furthermore, the present invention performs its application program information acquisition steps through operations in a manner transparent to the user of that application program.

An extensible test protocol port for rendered custom controls in accordance with this invention is described relative to the preferred embodiments as implemented in conjunction with a network file caching program and machine operable with Windows applications to facilitate use of an automated test tool. This network functions within a Graphical User Interface (GUI) which gives configurations and information about cache, plus statements relating to cache performance.

The test tool runs code written in a test language to automate tests. For rendered controls, the only previously available approach was to capture bitmaps which rely on color, screen resolution, font size, and many other factors. Also, the system cannot manipulate bitmaps as datatypes. The present invention returns data in text and numbers which are easily manipulated by a test language. The present invention avoids reliance on per-machine factors.

The test tools are able to use standard Windows API calls to manipulate (get and set) data in static text fields. The present invention provides a relatively simple protocol that allows the test tool to request and receive data from the application. The transactions are performed in a hidden static text field that is not displayed by the window manager.

The present invention offers a standard, extensible solution to accessing data inside graphical custom controls. The solution thus presented offers data to applications that use timers for updating information. The single hidden static text field is useable to retrieve any information in the application by using different commands. A hidden text field is transparent to users, and has minimal effect on the performance of the product.

Figure 2:
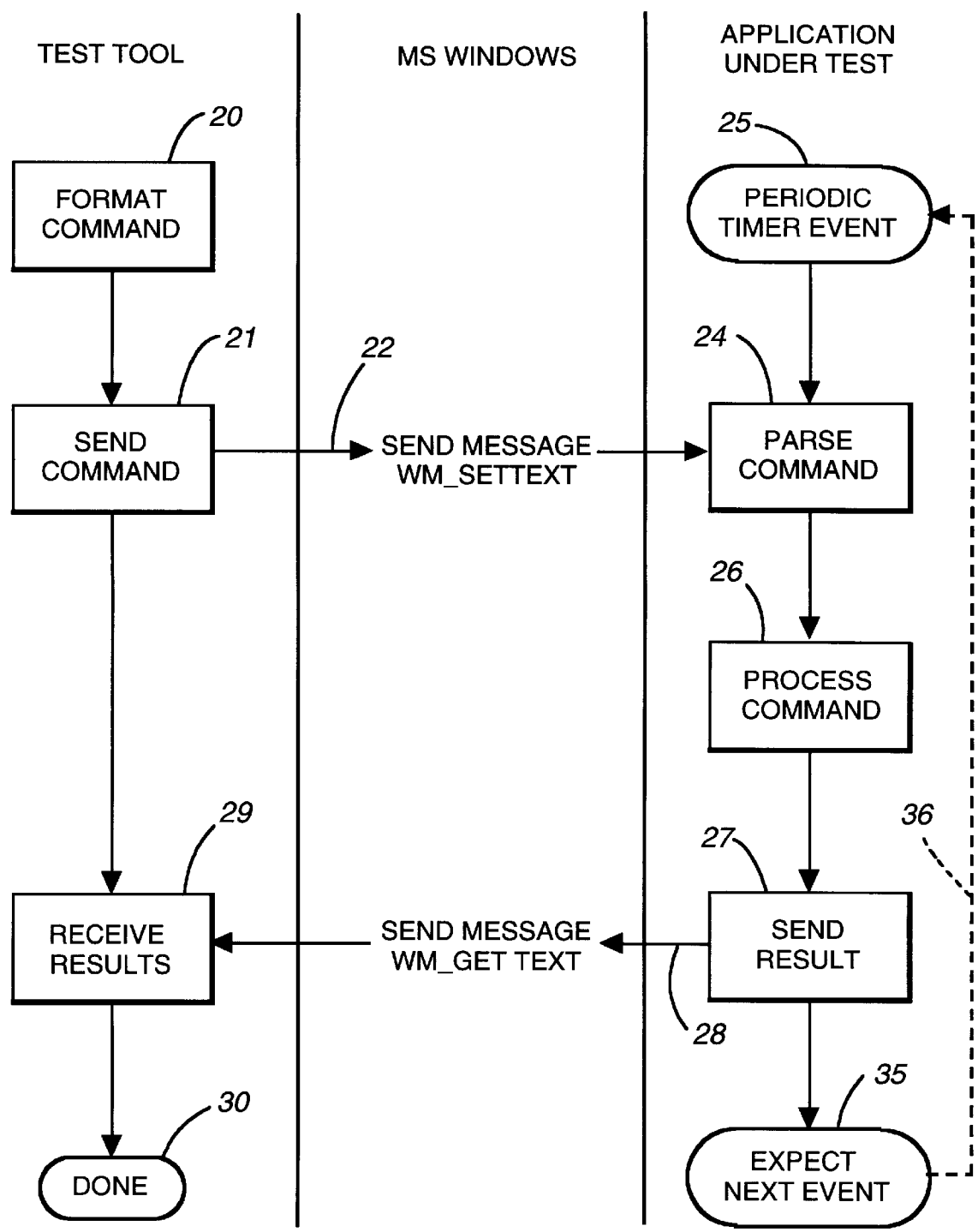
FIG. 2 is a flowchart of the interrelationships between a test tool, Window intermediary and the application under test.

The purpose of a test tool is to ensure that program and computer structure is operating properly. The test tool can run programs as if it were a user, and record the response of the application program and its associated hardware. In the diagram of FIG. 2, the test tool queries the application under test through Windows. The test tool causes the application under test to perform the same as it would for a normal user. The application program draws information in Windows, and changes text to pixels which the test tool cannot read. Unique commands are thus used to extract the text within the application program, and to allow its export to the test tool.

The hidden field has a unique identification associated with it. The application also has a unique window handle associated with it. The WM_SETTEXT message, in combination with the application window handle and hidden field identifier, allow the test program to send a character string to the hidden text field of the application.

If the test program senses a character other than a "0" set in the first character position of the hidden field, it is recognized that the application program is busy obtaining the information, and is not yet ready to transmit the same to the test tool.

Note that the FIG. 2 flowchart assumes the application program does a periodic check 25 to see if the test tool has requested any information. This check might occur with each graphic update cycle, for example. However, the test tool could immediately instigate the information retrieval, if desired.

The presence of a command causes parsing operation 24 and operation 26 to determine what information is requested and to obtain that information. After operation 27 sends the results to the test program module over interface connection 28, monitoring 35 for the next event is instituted. Ultimately, loop 36 can cause initiation of the periodic timer 25 inspection for the next request for information at connection 22.

The present invention advantageously utilizes code incorporated into the application. The application creates the static text field, and sets the attributes as hidden. The initial value of the hidden control is zero ("0"), which means no command is pending. A command from send command 21 at interface 22 causes the application under test to replace the "0" with a non-zero number. For example, the system might employ two commands represented by the numbers "1" and "2" to respectively request information on the number of drives cached, and on specific information about one of those drives.

If a "1" is entered into the field, the application replaces the first bit "0" with a "1" and, upon the retrieval of the requested information, entersa "0 #" where # might represent the number of drives. For example, if two drives are cached, the response is "0 2". If four drives are currently connected, the hidden field is then set to "0 4". A "2" command might represent a request to retrieve information on a particular one of the drives. Note that a "1" command could have information item identification associated with it. This could select particular drives or segments of the information fields for retrieval.

Figure 4:
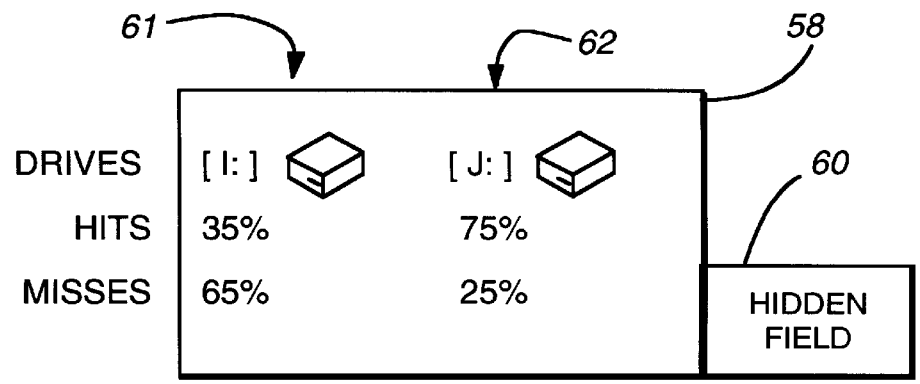
FIG. 4 is a presentation of typical graphical information contained in the application under test.

FIG. 4 shows an example of some graphical information 58 that might typically reside in the rendered custom control. In this example, data relating to two drives ("[I:]" and "[J:]") is stored in columns 61 and 62 of the rendered custom control. If the test tool enters "2 1", the application might then replace the text in hidden field 60 with "O I: 35% 65%" where "I: 35% 65%" is specific information about drive "I:". If an unimplemented number is entered into the field, the application responds with "0 Invalid Command".

The network file caching application module updates user graphical information once every second. During the update, the application checks for a command in the hidden field. The application recognizes a character that is not a "0" (idle) and, at action block 24, parses the command and any additional parameters. Based on the command, the application updates the hidden field with "0" (return to idle) and requested information. This allows asynchronous operation of the test program and application.

The test program initiates retrieval of information by causing entry of a command into the hidden field with any required parameters. The test program polls the hidden text field thereafter waiting for the first character to return to "0". The test program responds to the first character return to "0" by retrieving the value of the hidden field and parsing the data. Preferably, the test program polling aborts with an error indication if a return to "0" is not sensed within a predetermined timeout period.

An advantage of the present invention resides in the ability to write a single function in the test suite to execute any of the available commands. The function is useful with any application which has implemented the protocol in accordance with the invention. Alternatively, in an object oriented test language, it is possible to create a base class to implement the protocol with derived classes implemented to customize to various applications.

Figure 3:
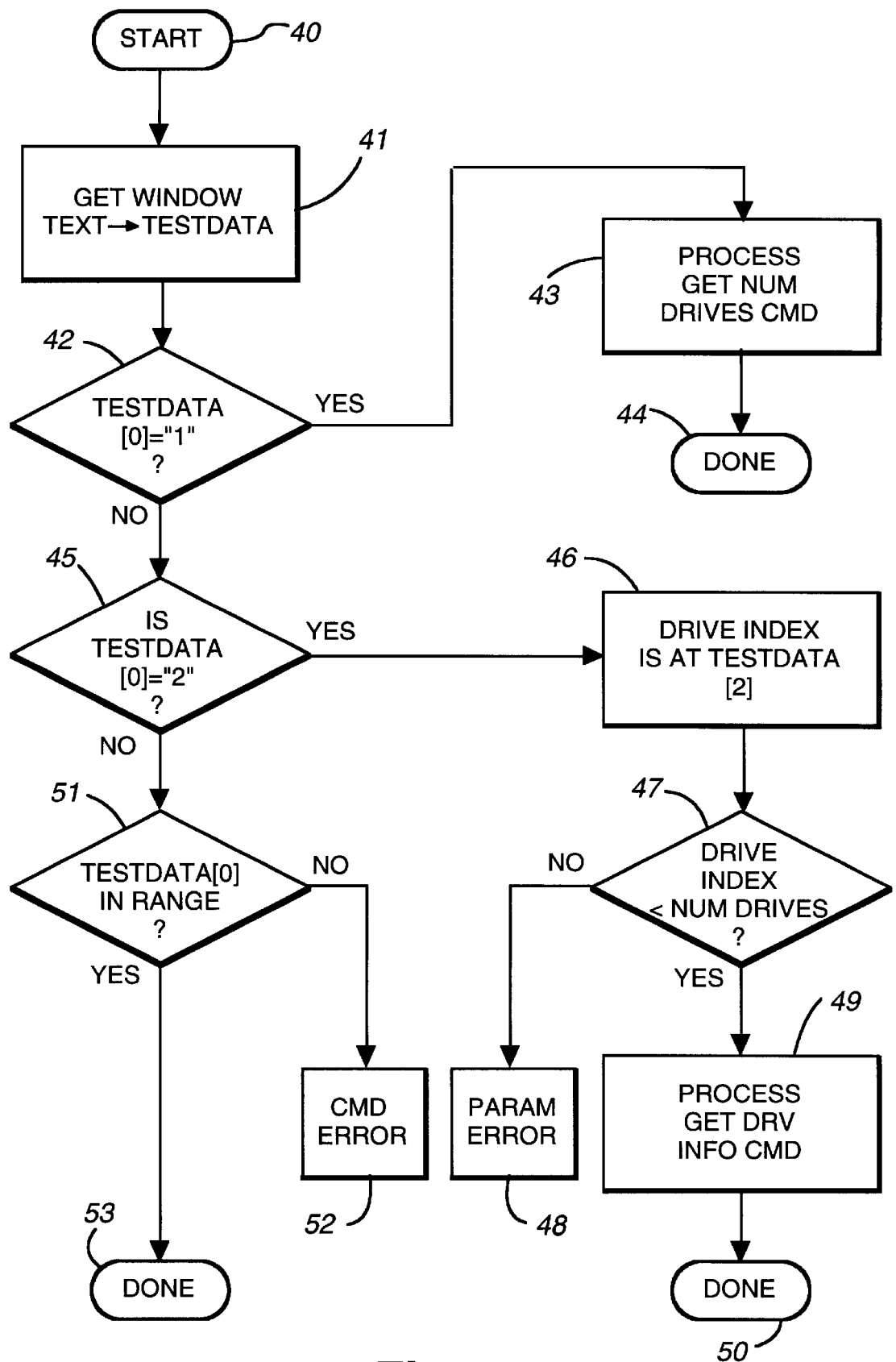
FIG. 3 is a flow diagram of some of the operations of the application under test.

FIG. 3 presents an expansion upon the parse command 24 and process command 26 blocks of FIG. 2. The operation responds to start 40 by recognizing a shift from the idle "0" command to one of the other active commands indicating some form of test data is requested by the test tool module. If the command "1" is recognized at decision block 42, the application module 43 determines the number of drives, in the example herein described, and is ready to respond at 44 by setting the first bit to a "1" in the hidden field with the requested information accompanying it.

If the command is not a "1", then decision block 45 determines if it is a "2" command. If so, it determines at 46 the identity of the drive selected by the test tool module. This number is inspected in decision block 47 to determine if information was requested on a drive number higher than is actually operational with the application module. A parameter error 48 is indicated if the drive index does not match the number of drives in operation. An acceptable decision from block 47 results in execution of a procedure at 49 for obtaining the information for the selected drive and delivery thereof at 50 for transmission to the test program module.

Note that failure to recognize any valid command causes a command error indication 52. That is, if the string testdata[0] is less than "0" or greater than "2", then testdata[0] is out of range (not 0, 1 or 2) so a command error 52 is indicated. Otherwise, testdata[0] is in range. Since decisions 42 and 45 have already determined the command is not a "1" or a "2", it logically follows it is a "0" or idle state as is reflected at 53.

Figure 5:
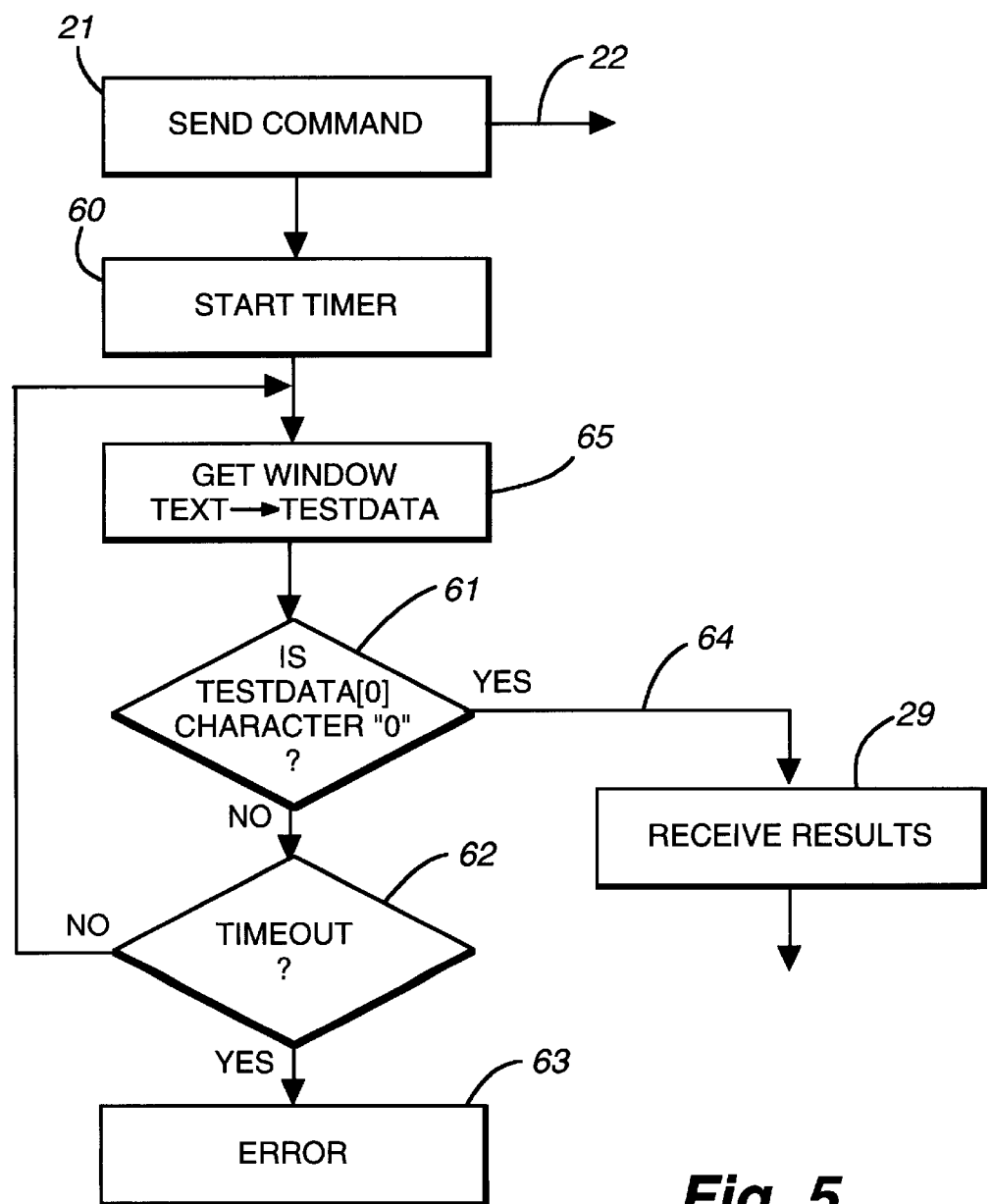
FIG. 5 is a somewhat more detailed flow diagram of operations performed in the test tool.

FIG. 5 illustrates additional operations performed at the test tool module in FIG. 2. Upon block 21 transfer of a command over connection 22 into the windows interface, a timer 60 is initiated. Periodically, the test program module at 65 obtains the testdata[0] and inspects the first character of the hidden field in the application module, and renders a decision 61 based upon the result. Failure of that character to change from a "1" to a "0" results in inspection of the timeout status at block 62. If timeout has occurred, an error 63 is flagged.

Lack of a timeout from decision block 62 returns the module operation to inspect for a hidden field first character change once again. Detection of this transition thereafter causes the reception 29 of the information made available by the application module.

The present invention is suitable for use in a single stand-alone machine, as well as in separate machines interconnected via a communication link.

While the exemplary preferred embodiments of the present invention are described herein with particularity, those having normal skill in the art will recognize various changes, modifications, additions and applications other than those specifically mentioned herein without departing from the spirit and scope of this invention.

What is claimed is:

1. A method of automatic data exchanging between a test program module which requires selected information concerning an application program executable by a user, wherein the application program is configured to store information in graphic presentation form in a computing system through the computer implemented steps of:

including a command generating module in the test program module to generate an automated command that requests information from the application program, the automated command, when generated, generated in a manner transparent to the user of the application program;

establishing a hidden storage field, the hidden storage field formed of a static test field, established in a manner transparent to the user and having a unique identification associated therewith;

transferring said command from said test program module to the hidden storage field at the application program the command transferred in a manner transparent to the user identifying the information requested by the command transferred to the hidden storage field, the information identified in a manner transparent to the user;

retrieving said requested information from the hidden storage field in a manner transparent to the user;

placing, in a manner transparent to the user, said requested information as retrieved in said hidden storage field as an array of characters thereat; and notifying the test program module that the requested information is available in a manner transparent to the user.

2. A method in accordance with claim 1 wherein said notifying step includes the step of setting a flag in at least one position in said hidden storage field when the requested information is available, and including a step of periodically sampling of said flag position by said test program module.

3. A method in accordance with claim 2 wherein said placing step includes the step of forming the array of characters in said hidden storage field including the flag and the requested information.

4. A method in accordance with claim 3 wherein said test program module is included within a program for determining the operational integrity of an application program.

5. A method in accordance with claim 1 which includes the step of setting an error indication if said notifying step has not occurred within a preselected period of time.

6. A method in accordance with claim 5 which includes the step of storing blocks of information each from one of a plurality of sources associated with the application program, and wherein said identifying step includes the step of selecting one of said blocks for retrieving and placing in said hidden storage field.

7. A computer program storage medium readable by a computing system and encoding a computer program of instructions for executing a computer process to interface a test program with an application program comprising:

including a command generating module in the test program module to generate an automated command that requests information from the application program, the automated command generated in a manner transparent to the user of the application program;

establishing a hidden storage field the hidden storage field formed of a static test field, established in a manner transparent to the user and having a unique identification associated therewith;

transferring said command from said test program module to the hidden storage field at the application program the command transferred in a manner transparent to the user;

identifying the information requested by the commands transferred to the hidden storage field, the information identified in a manner transparent to the user;

retrieving said requested information from the hidden storage field in a manner transparent to the user;

placing, in a manner transparent to the user, said requested information as retrieved in said hidden storage field; and notifying the test program module that the requested information is available in a manner transparent to the user.

8. A method in accordance with claim 7 wherein said notifying step includes the step of setting a flag in at least one position in said hidden storage field when the requested information is available, and including a step of periodically sampling of said flag position by said test program module.

9. A method in accordance with claim 8 wherein said placing step includes the step of forming the array of characters in said hidden storage field including the flag and the requested information.

10. A method in accordance with claim 9 wherein said test program module is included within a program for determining the operational integrity of an application program.

11. Apparatus for automatic data exchanging between a test program which requires selected information concerning an application program wherein the application program is configured to store information in graphic presentation form in a computing system comprising:

including a command generating module in the test program module to generate an automated command that requests information from the application program, the automated command, when generated, generated in a manner transparent to the user of the application program;

establishing a hidden storage field, the hidden storage field formed of a static test field, established in a manner transparent to the user and having a unique identification associated therewith;

transferring said command from said test program module to the hidden storage field at the application program the command transferred in a manner transparent to the user identifying the information requested by the commands transferred to the hidden storage field, the information identified in a manner transparent to the user;

retrieving said requested information from the hidden storage field in a manner transparent to the user;

placing, in a manner transparent to the user said requested information as retrieved in said hidden storage field as an array of characters thereat; and notifying the test program module that the requested information is available in a manner transparent to the user.

12. Apparatus in accordance with claim 11 wherein said hidden storage field includes at least one position settable by said flag generator when the requested information is available.

13. Apparatus in accordance with claim 12 which includes a test program component for periodically sampling said flag generator settable position.

14. Apparatus in accordance with claim 13 wherein said hidden storage field includes storage positions for retaining the array of characters including said flag generator settable position and the requested information, said test program component retrieving said requested information from said hidden storage field in response to presence of a flag in said settable position.

15. Apparatus in accordance with claim 11 including a timer initiated by generation of said command to produce an error indication if said flag generator has failed to produce an output before a predetermined passage of time.

* * * * *